Aug. 20, 1968     R. W. OKEY     3,398,088

PHOSPHOROUS REMOVAL IN MEMBRANE WASTE WATER TREATMENT

Filed May 31, 1967     3 Sheets-Sheet 1

INVENTOR.
ROBERT W. OKEY

BY
ATTORNEY

Aug. 20, 1968 R. W. OKEY 3,398,088
PHOSPHOROUS REMOVAL IN MEMBRANE WASTE WATER TREATMENT
Filed May 31, 1967 3 Sheets-Sheet 2
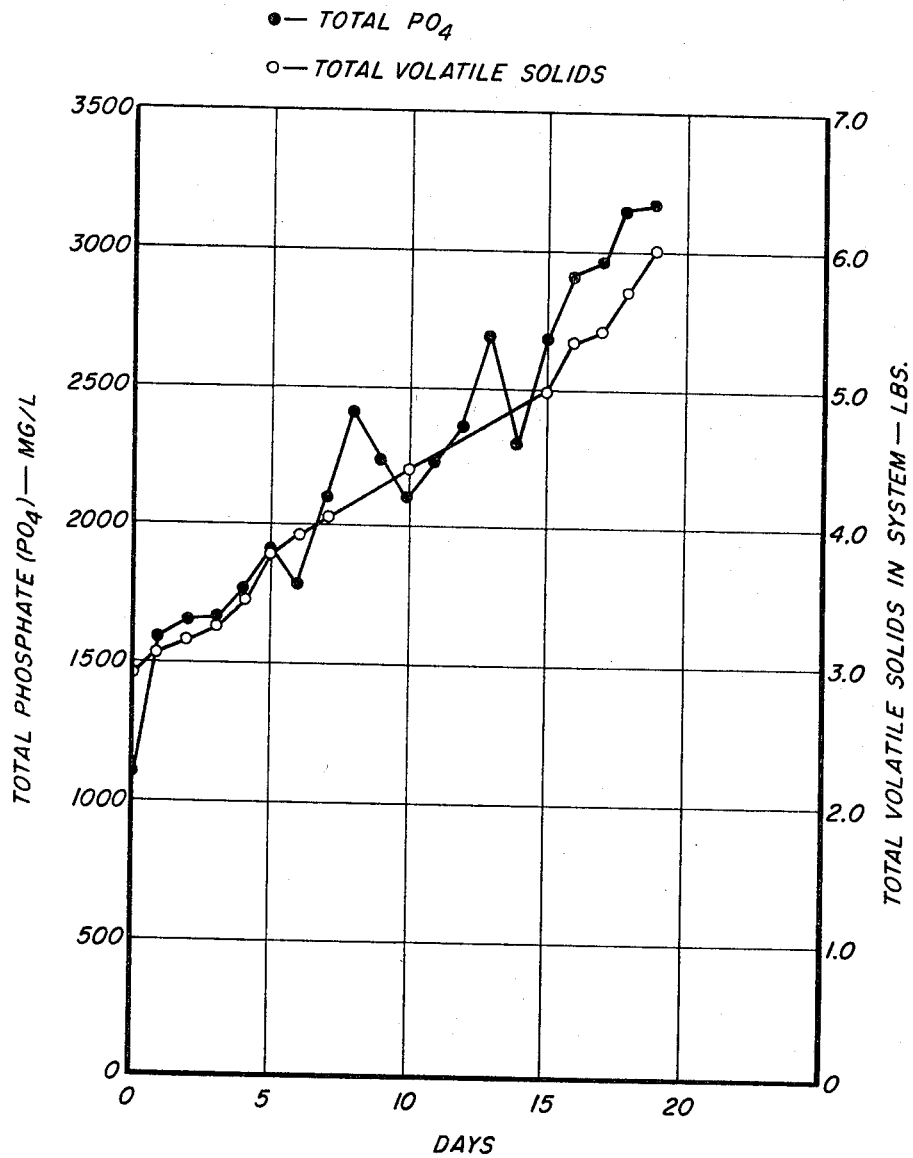
FIG. 5
INVENTOR.
ROBERT W. OKEY
BY 
ATTORNEY

United States Patent Office 3,398,088
Patented Aug. 20, 1968

3,398,088
PHOSPHOROUS REMOVAL IN MEMBRANE
WASTE WATER TREATMENT
Robert W. Okey, Westport, Conn., assignor to Dorr-Oliver Incorporated, Stamford, Conn., a corporation of Delaware
Filed May 31, 1967, Ser. No. 642,572
2 Claims. (Cl. 210—3)

ABSTRACT OF THE DISCLOSURE

The utilization of lime in a membrane waste treatment system to precipitate phosphorous.

---

Phosphorous is a normal constituent of sewage and many industrial wastes. It is present in these waste streams in both inorganic and organic forms. Normal sewage treatment processes do not remove a substantial quantity of phosphorous. Hence, most of the incoming material is contained in the effluent stream.

Phosphorous is known to be required for the growth of unicellular and multicellular aquatic plants. As a consequence, when excessive quantities of phosphorous reach receiving waters, the growth of algae and other aquatic plants is frequently stimulated. When this occurs, the receiving water is said to be enriched or eutrophic.

The substantially complete removal of phosphorous from sewage treatment plant effluents would assist in reducing the quantity of aquatic plant growth, hence enhancing the use of receiving waters and eliminating the aesthetic problem associated with excessive plant growth.

Phosphorous comes into the sewage treatment plant basically in two forms—organic and inorganic. In normal sewage treatment operation, some inorganic phosphorous is incorporated in the activated sludge process for bacterial growth and removed from the liquid stream when excess quantities of sludge are wasted. Organic phosphorous, if it is soluble, may be degraded or passed through the plant unchanged. If it is not soluble, it joins the bio-mass and suffers substantially the same fate as the wasted sludge which may be anaerobically digested or incinerated.

It is therefore an object of the present invention to provide a solution to this problem of phosphorous enrichment of a receiving water in the context of a membrane-separation biological-reaction waste treatment system such as disclosed in copending application Serial No. 578,374, filed Sept. 9, 1966. It can be shown that membranes will retain organic phosphorous molecules. It can also be shown that calcium ions at elevated pH values can be employed to tie up or precipitate the inorganic phosphorous. The precipitate is then captured or retained in a sewage treatment process employing membranes.

This invention relates to a sewage treatment process employing membranes in which sufficient calcium is added to raise the pH above 8.5 but to less than 10.0, which permits the precipitation of substantially all of the inorganic phosphorous resident in the system, but concurrently because of the equilibrium nature of the calcium phosphate precipitation reaction, the process permits sufficient phosphorous to be available for bacterial growth.

In the normal operation of a system employing this process, calcium as calcium hydroxide would be added to the influent waste stream in sufficient quantities to raise the pH to the specified values, and the calcium phosphate resulting would be incorporated in the biomass and removed with the wasted activated sludge. Removals of total phosphorous greater than 90% may be expected, and with careful operation this figure may be increased to 95% or more.

The membranes employed in the system may be of any material, but the water transport process must be principally by reverse osmosis and/or ultrafiltration.

The present invention provides two major components, the first being a biological reactor containing liquid-carried biological life. The reactor is adapted to receive a nutrient stream, for example raw sewage, and in the case of aerobic biological life, a supply of oxygen to sustain a metabolic conversion of the nutrients by the biological life. A stream of the contents of the biological reactor is withdrawn and circulated to the second major system component, a membrane separator. This separator has a selectively-permeable membrane or membranes of such characteristics as to permit through-membrane transport of the carrier liquid while preventing through-membrane flow of the biological life. Additionally, means is provided to introduce lime into the system to precipitate and thus remove phosphorous from the system effluent.

In waste-treatment applications of the present invention, the membrane preferably retains not only the biological life but also the large-moleculed, refractory or slowly-biodegradable organic nutrients whereby sufficient opportunity and time is provided for the metabolic conversion of these nutrients. In certain waste treatment applications it may be desirable to utilize a membrane which passes dissolved non-biodegradable inorganics into the effluent. In other applications of the invention, the biological life may produce a valuable product in which case it may be desirable for this product to pass through the membrane for subsequent recovery.

As the membrane separation operations occuring in the present invention are reverse osmosis and ultra-filtration, a pressurized feed to the membrane separator is utilized so as to establish the required pressure drop across the membrane. The carrier liquid passes through the membrane and exits from the membrane separator as an effluent stream. The biological life and the major portion of the carrier liquid are retained on the feed side of the membrane and exit from the membrane separator as a so-called concentrate stream. This concentrate stream is recirculated back across the membrane to permit further membrane-separation action thereon. This recirculation is accomplished by direct recycling and/or return recirculation through the biological reactor. Provision is also made for a bleed off of biological solids from the system to permit control of the solids concentration and/or recovery of a valuable-product type of biological life.

Because of the specific-size separation characteristics of semi-permeable membranes, effluent quality is not adversely effected by the concentration of the feed to the separator. Therefore, the biological reaction systems of the present invention can be operated at much higher solids concentrations than possible heretofore. Consequently, the present invention, as applied to sewage treatment systems, permits the biological reactor to directly accept raw sewage thus obviating the requirement for a primary clarifier. This results in metabolic conversion of the entire sewage nutrient stream and thus reduces the overall disposal-sludge solids quantity. Further, the wastage solids drawn from the biological reaction system are more concentrated and therefore less voluminous. Additionally, in the present invention the components of the reaction system are smaller because of the higher permissible solids concentrations. Finally, the plant effluent contains no biological solids despite the high solids concentrations, and it is of exceptionally high quality, having no bacteria and no known virus. Accordingly, the plant effluent needs no chlorination before being discharged to a receiving water. The invention will become apparent from the following description and appended claims when read in conjunction with the accompanying drawings wherein:

FIG. 5 is a graph showing a buildup over several days of the total phosphates in the contents of the components of a membrane-separation biological-reaction waste treatment system such as that shown, for example, in FIG. 2.

Figure 1:
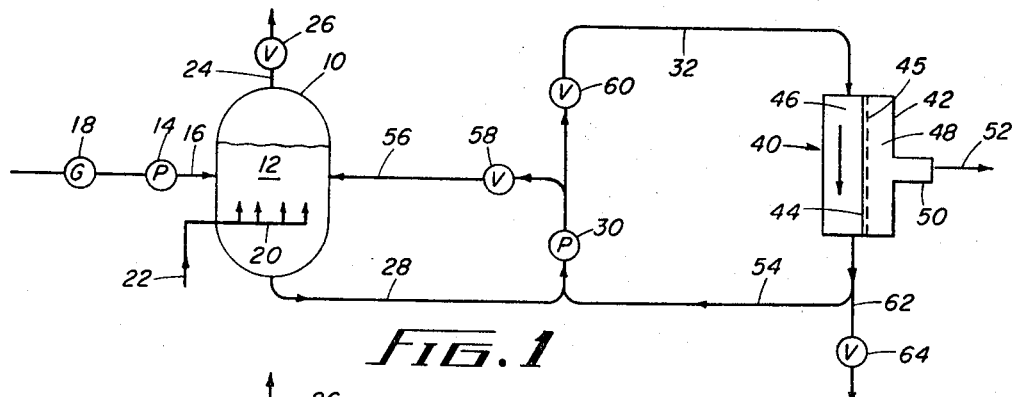
FIGURE 1 is a diagrammatic flowsheet showing the novel system of the present invention incorporating a biological reactor and ultra-filtration/reverse-osmosis membrane separator.

Referring now to the drawings in detail, FIGURE 1 shows a presurized biological reactor 10 which contains a body of biological-life-carrying liquid 12. The biological life is sustained by nutrients supplied through pump 14 and conduit 16. In the application of the present invention to sewage treatment, a comminuter or grinder 18 is preferably incorporated in the nutrient supply line to reduce the size of particles in the raw sewage to permit their metabolic conversion and to prevent oversize particles from blocking the flow in the system, particularly in the membrane separator.

For those applications wherein the biological life in the reactor is aerobic, a disperser 20 is incorporated in the reactor and is connected to a suitable source of compressed air or oxygen 22 to provide the required oxygen for the metabolic conversion of the nutrient stream. The reactor also has a vent 24 having a suitable control device such as valve 26 to permit the escape of gases.

A stream of the contents of the reactor is extracted through a withdrawal conduit 28 and is circulated by a pump 30 through a feed conduit 32 to a membrane separator 40. The separator includes a suitable housing 42 which is divided by a selectively-permeable membrane or plurality of membranes 44 into a feed passage 46 and an effluent space 48. The characteristics of membranes 44 are selected so that they perform a reverse-osmosis and ultra-filtration separation operation wherein the biological life is retained on the feed side of the membrane. As a pressure differential must be maintained across membrane 44 to effect the reverse-osmosis and ultra-filtration, a perforate membrane support 45 is provided on the effluent side of the membrane. Housing 42 is provided with an effluent outlet 50 connecting with the effluent space 48. The carrier liquid which passes through semi-permeable membranes 44 is collected in effluent space 48 and exits from the separator as an effluent stream 52.

The material which is retained on the feed side of membranes 44, which includes the bulk of the carrier liquid as well as the biological life, passes out of feed space 46 as a somewhat concentrated stream through conduit 54. Concentrate conduit 54 leads back to the inlet side of the circulation pump so that at least a portion of the concentrate stream is directly recycled through feed conduit 32 to pass across the membrane again.

In order to maintain the desired concentration of biological life in reactor 10, a portion of the combined concentrate stream and reactor-withdrawal stream exiting from pump 30 is recirculated through the reactor by a return conduit 56. The division of the pump output to return conduit 56 and to feed conduit 32 is controlled by valves 58 and 60 in those respective conduits.

As the continued growth of biological life in the system may in time overload the system with biological life solids, a bleed conduit 62 with a control valve 64 is incorporated in the separator loop of the circulation system.

Figure 2:
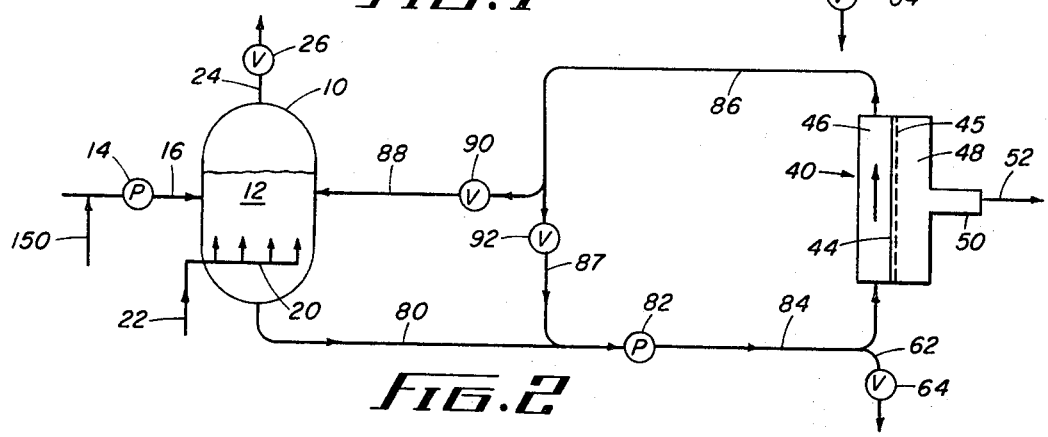
FIGURE 2 shows a diagrammatic flowsheet of a modified circulation arrangement for the components of the present invention.

The system illustrated in FIGURE 2 is generally similar to that of FIGURE 1, and the same reference numerals have been applied to identical components throughout. The primary differences between the systems of FIGURES 1 and 2 lie in the circulation arrangements. Thus, in FIGURE 2, a stream of the contents of reactor 10 is extracted through a withdrawal conduit 80 and is circulated by a pump 82 through a feed conduit 84 to the membrane separator. A portion of the concentrate leaving membrane feed space 46 through a concentrate conduit 86 is recirculated through reactor 10 by a return conduit 88, and another portion is directly recycled to the separator through recycle or bypass conduit 87. The split between the return and the direct-recycle portions of the concentrate stream is controlled by valves 90 and 92 respectively located in return conduit 88 and recycle conduit 87.

Figure 3:
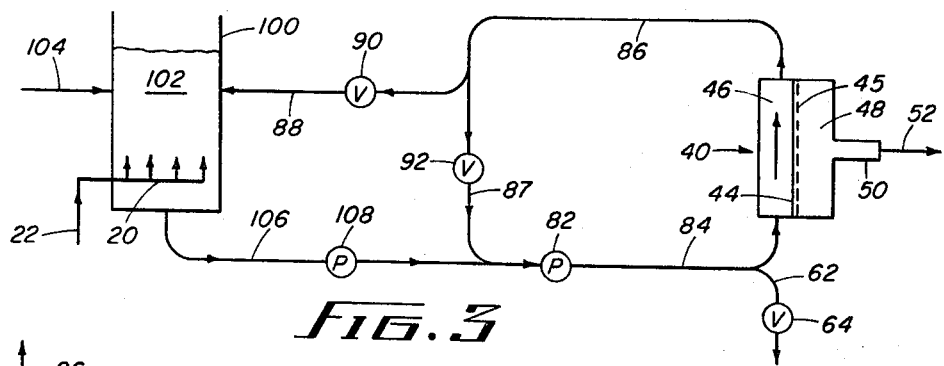
FIGURE 3 is a diagrammatic flowsheet showing a modified arrangement of the present invention wherein an ambient-pressure biological reactor is utilized.

The system of FIGURE 3 is generally similar to that of FIGURE 2, and accordingly the same reference numerals are applied to identical elements. The primary difference between these figures lies in the incorporation of an ambient pressure biological reactor 100 in FIGURE 3. Reactor 100 contains a body of biological-life-carrying liquid 102 and is supplied with nutrients through a nutrient conduit 104. A stream of the contents of reactor 100 is withdrawn through a conduit 106 and is introduced into the pressurized side of the system by a pump 108.

Figure 4:
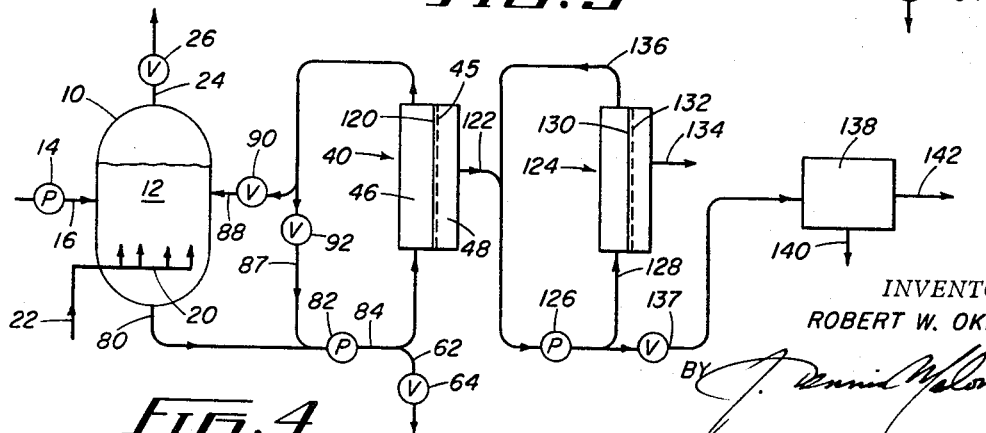
FIGURE 4 is a diagrammatic flowsheet showing a further embodiment of the present invention wherein a second-stage membrane is utilized to separate the first-stage effluent into fractions.

The system illustrated in FIGURE 4 is generally similar to that of FIGURE 2, and the same reference numerals are applied to identical elements. However, in FIGURE 4, membrane separator 40 is the first of two separator stages. Separator 40 incorporates a relatively "loose" membrane 120 which is selected to retain the biological life on the feed side thereof and to through-transport not only the carrier liquid but also certain molecules which are smaller than the biological life. For example, in waste treatment applications, these molecules may be the inorganic nutrients or non-biodegradables contained in the waste stream supplied to the reactor. Alternatively, these molecules may be a valuable product resulting from the metabolic conversion. In either case, an effluent stream 122 containing these substances is discharged from separator 40 and is circulated to a second-stage separator 124 by a pump 126 through a feed conduit 128.

Separator 124 includes a membrane or membranes 130, a membrane support 132, and respective outlets connected to an effluent conduit 134, and a concentrate conduit 136. The concentrate conduit leads back to the inlet side of circulation pump 126 to directly recycle the concentrate across the membrane. Membrane 130 is a relatively "tight" membrane which retains molecules of the inorganic nutrients or the metabolic products while permitting the carrier liquid to pass through. In this manner, the repetitive recycling of the feed to the second-stage membrane produces a concentration of the effluent from the first stage. Periodically or continuously a portion of this concentrated stream is bled-off through valved conduit 137 to a recovery or extraction unit 138 which operates on the concentrated bleed to separate the solids carried thereby from the carrier liquid. For example, unit 138 may operate by direct precipitation, adsorption-precipitation, ion exchange, solvent extraction, or distillation. The separated fractions are discharged from unit 138 through respective conduits 140 and 142.

EXAMPLE

To specifically exemplify the use of the above-described systems and processes, an application of the invention to the sewage treatment field will be described in detail in connection with the flowsheet of FIGURE 1. Typical domestic raw sewage from a municipality is directly received for treatment by the present system. Such raw sewage is a very dilute water-borne composition having a few solid constituents in solution and a major portion of its solid constituents suspended in the water. This raw sewage is comminuted in grinder 18 to ensure a maximum particle size of approximately 1/32 of an inch and is pumped into the biological reactor which is maintained at substantially the pressure required on the feed side of the membrane (in the range of 20 to 100 p.s.i.).

The reactor contains typical, water-borne, aerobic biological life such as commonly employed in activated-sludge sewage systems. The reactor contents are aerated with sufficient oxygen to sustain the metabolic conversion of the nutrient material in the raw sewage, and the gases produced by the metabolic conversion, primarily $CO_2$, and other waste gases are permitted to escape from the pressurized reactor through the controlled vent 24. The reactor is suitably sized, and the withdrawal and return flows are selected, to achieve a retention time in the reactor in the range of 10 to 30 minutes. The wastage of biological solids through bleed conduit 62 is controlled to maintain the system at a high concentration of biological life solids, for example 3%, with the load ratio of biological oxygen demand (BOD) to biological solids being in the order of .03 to 0.3.

The membrane in separator 40 in this exemplification was selected to achieve a separation size corresponding to molecular weights in the order of 200 to 400. Such a membrane effectively retains the biological life and substantially all of any unadsorbed or unmetabolized organic molecules or suspended particles from the raw sewage, while permitting transport of water and dissolved inorganics such as salts. The separation size of the membrane is preferably selected to be well below the size of the retained material and well above the size of the material to be passed through the membrane whereby degradation of the membrane flux rate from plugging-type phenomena is alleviated.

To consider the factors which affect the desirable volumetric flow rates in this exemplification of the invention, the sewage input to the reactor is assigned the unitary volumetric flow value of Q. The flow in the return loop of the system is governed by the need to avoid depletion of the biological population in the reactor. Since under steady-state operating conditions, the reactor withdrawal rate exceeds the return rate to the reactor by 1Q and since the return flow to the reactor is somewhat more concentrated than the withdrawal flow, population depletion can be avoided by increasing the recirculation through the reactor so as to offset the 1Q excess withdrawal rate. In this exemplification of the invention, it was found that a return recirculation value of 20Q was satisfactory to achieve the above purposes. Therefore, the withdrawal flow in conduit 28 is 21Q and the return flow to the reactor through conduit 56 is 20Q.

The determinative factors affecting the desirable flow rates in the separator emanate from the membrane itself. To alleviate the adverse effects of concentration gradients which tend to build up transversely to the surface of the membrane as the feed progresses along it, turbulent flow is preferred over the membranes to minimize these concentration gradients. Further, higher flow velocities and the corresponding turbulence along the membranes assist in a "scrubbing" action to inhibit the buildup or deposit of solids or a cake on the surfaces of the membrane. Therefore, for efficient membrane operation the feed rate to the separator should be of high magnitude in relation to the effluent rate, for example in the range of 100 times as great for a specific type and arrangement of membrane surfaces in the separator. Therefore, since the effluent flow from the separator is substantially 1Q under steady-state operations, the feed rate in conduit 32 may be 101Q and the concentrate flow in conduit 54 may be 100Q.

Desirable upper limits on the flow through the separator are dictated by the fact that the membranes can be damaged by erosion at excessively high velocities and/or that membranes 44 may be physically peeled off supporting structures 45. Further, it is obvious that from a pump-power viewpoint, the recirculation through the reactor as well as the direct recycling of the concentrate are desirably kept to the minimums permitted by the above-mentioned flow requirements.

As best understood in reference to the flowsheet of FIGURE 2, the split between the return flow in conduit 88 and the direct recycle flow in conduit 87 can be varied anywhere between the extremes of 100% return and 100% recycle by appropriate manipulation of valves 90 and 92. Assuming the flow requirements described above indicate that flow through the membrane separator should be at least 100Q and the return flow to the reactor should be at least 20Q, it is clear that these minimums are met by returning the entire 100Q concentrate flow from the separator to the reactor with no direct recycle or bypass flow through conduit 87. However, a reduction of pumping power can be achieved while maintaining desired minimum flows, by recycling 80Q through bypass conduit 87 and by returning 20Q through conduit 88.

Further, if it is desirable to increase the concentration of biological solids in the separator loop of the circulation system, for example in preparation for bleeding off solids, return valve 90 may be closed. (This corresponds to closing return valve 58 in FIGURE 1, under which conditions the two flowsheets are identical.) This action causes a depletion of biological solids from the reactor and transfers them to the recycling flow in the separator loop thus increasing the solids concentration therein. In installations in which the volume of the separator loop is small in comparison to that of the reactor, this concentration in the separator loop can be accomplished without a proportionate decrease in the biological life concentration in the reactor.

In the exemplary utilization of the present invention in sewage treatment, the effluent from the membrane device is of very high quality. Specifically, the biological oxygen demand (BOD) of the effluent is in the order of 3 milligrams per liter, the chemical oxygen demand (COD) in the order of 20 milligrams per liter, with no bacteria, and no known virus. These high quality effluents are attributable to the retention of the slowly-biodegradable molecules as well as the bacteria and virus by the membrane. Effluent of this quality is suitable for discharge into receiving waters without further treatment, and therefore the present invention obviates the requirement for chlorinating the effluent prior to its discharge.

As a further advantage, the present membrane separator can operate efficiently at very high concentrations of the biological solids. Although in the example a 3% biological solids concentration was utilized, the separator can effectively operate at concentrations as high as 7 to 12%. The factors limiting these maximum concentrations are (1) excessive viscosity which causes higher pump-power requirements and flow distribution problems in the membrane separator, and (2) the undesirable competition between such thick slurries and the membranes for the available water. In other words, above the maximum limits of concentration, the membrane cannot effectively withdraw water from the feed slurry despite the pressure drop existing across the membrane.

The ability of the membrane separator to efficiently operate on these thick, high-biological-solids-concentration slurries is a distinct contrast to prior art metabolic sewage treatment plants wherein the biological reactor is commonly operated at about 0.3 to 0.5% solids concentration because of the limitations of the secondary clarifier.

Consequently, with these higher permissible biological-life concentrations, the size of the reactor can be reduced while still allowing for complete adsorption of the sewage nutrients upon the biological life in the reactor.

A further advantage resulting from the operation of the system at high solids concentration is that the periodic bleed-off of excess biological life occurs at the higher concentrations. Therefore, the waste sludge has a much lower volume per weight of solids, and this eliminates the need for a thickening step which is commonly utilized in the prior art activated sludge systems.

Finally, because of the capability of the phase separator of the present invention to operate at very high solids concentration, the need for the conventional prior art primary clarifier is obviated, and in the present invention raw sewage can be fed directly to the biological reactor. This effects not only a capital saving, but it also means that the entire nutrient supply in the raw sewage is subjected to metabolic conversion whereby the total weight of solids for disposal is reduced.

Figure 6:
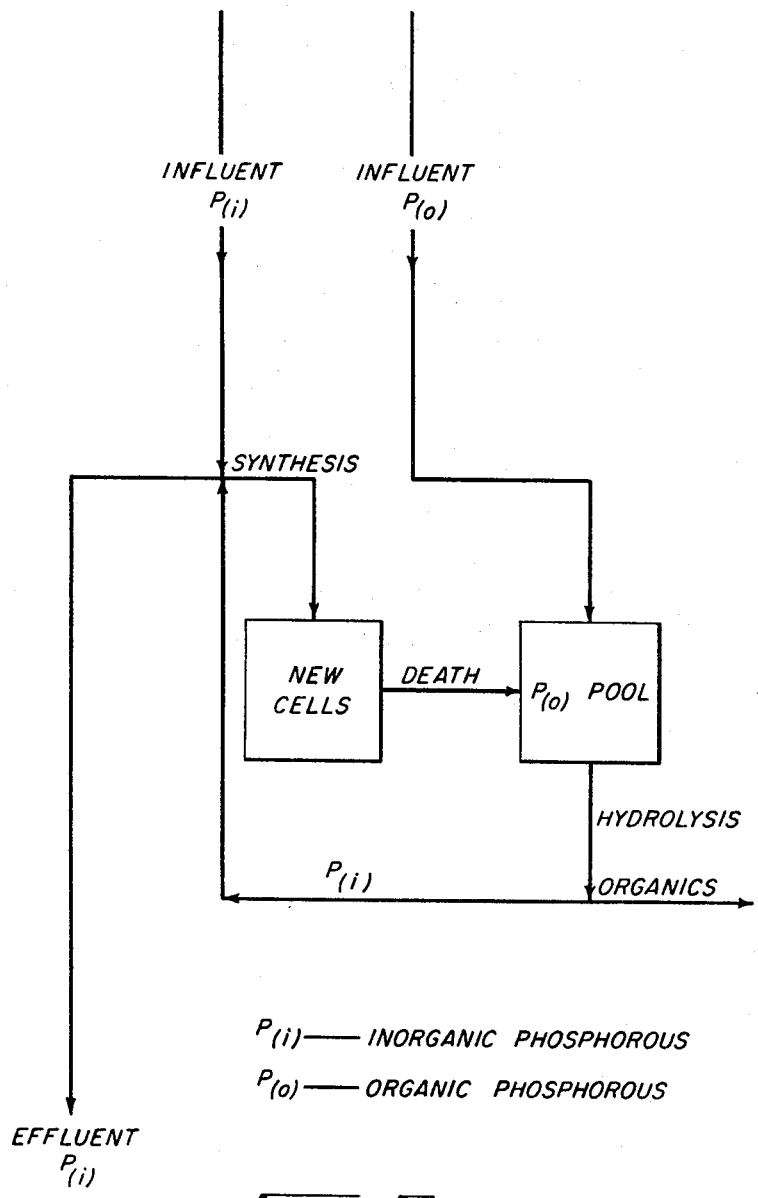
FIG. 6 is a chart which shows the movement of phosphates (both organic and inorganic) from the influent, to the storage pools of phosphates in a system such as shown in FIG. 2, and then on to the effluent and the bleed streams and which also shows the effects of cell synthesis, cell death and organic hydrolysis on the phosphate pools.

Referring now to the utilization of calcium hydroxide in the above described systems, this lime may be introduced into the influent to the waste system as exemplarily shown at 150 in FIGURE 2. The lime provides sufficient calcium to permit precipitation of the inorganic phosphorous. An analysis of the total influent and effluent phosphorus at a pilot plant over a period of substantial solids build-up showed a continuing retention despite the fact that more than sufficient phosphorus was present for synthesis. Over this period of 19 days, the average removal of phosphorous by the system was approximately 22%. The build-up of phosphate and the accumulation of total volatile solids are shown in FIGURE 5. The membranes being employed would not retain inorganics. As a consequence, it is necessary to conclude that orthophosphate was being incorporated faster than the organophosphorous compounds contained in the system were being hydrolyzed. These data suggest that the phosphorous moves through the system as is postulated in FIGURE 6.

The behavior of the system suggested that providing a slight excess of calcium at elevated pH would result in substantially complete removal. A pH of 8.5 to 9.0 with excess calcium is required to complete the removal of phosphorous. Test work was carried out by applicant in which the raw sewage influent pH was increased to the prescribed level with slaked lime. The removal of total phosphate was found to be to 95% in this work. No change in membrane flux was observed over the short period of this work.

As this invention may be embodied in several forms without departing from the spirit or essential characteristics thereof, the present embodiments are illustrative and not restrictive. The scope of the invention is defined by the appended claims rather than by the description preceding them, and all embodiments which fall within the meaning and range of equivalency of the claims are therefore intended to be embraced by those claims.

I claim:
1. A process of treating a phosphorous-containing waste stream comprising the steps of:
    (a) feeding the waste stream to a biological reactor as a nutrient supply for aerobic biological life contained in the reactor;
    (b) supplying the biological life in the reactor with oxygen to support the metabolic conversion of the waste nutrients;
    (c) drawing off a biological-life-containing stream from the reactor;
    (d) feeding the biological-life-containing stream to one side of a selectively-permeable membrane while maintaining a pressure-drop across the membrane from said one side to the opposite effluent side thereof;
    (e) retaining the biological life on said one side of the membrane while through-transporting an effluent stream of carrier liquid;
    (f) removing the biological life retained by the membrane from said one side thereof as a concentrate stream;
    (g) recirculating at least a portion of the concentrate stream back to the biological reactor;
    (h) and adding calcium ions to react with the phosphorous-containing waste stream to precipitate out calcium phosphate whereby the precipitated phosphorous is retained on said one side of the membrane along with the biological life.
2. A process as defined in claim 1, said step of adding calcium ions being accomplished by adding lime to the waste stream feeding to the reactor.

References Cited

UNITED STATES PATENTS 3,188,288   6/1965   Smith _____ 210—11
3,236,766   2/1966   Levin _____ 210—18 X MICHAEL E. ROGERS, *Primary Examiner.*